(12) United States Patent
Dalsgaard et al.

(10) Patent No.: US 8,923,228 B2
(45) Date of Patent: Dec. 30, 2014

(54) IDLE MODE CAMPING PRIORITY

(75) Inventors: Lars Dalsgaard, Oulu (FI); Tero Henttonen, Espoo (FI); Jussi Ojala, Helsinki (FI)

(73) Assignee: Nokia Corporation, Espoo (FI)

( * ) Notice: Subject to any disclaimer, the term of this patent is extended or adjusted under 35 U.S.C. 154(b) by 39 days.

(21) Appl. No.: 13/503,025

(22) PCT Filed: Sep. 17, 2010

(86) PCT No.: PCT/FI2010/050720
§ 371 (c)(1),
(2), (4) Date: Apr. 19, 2012

(87) PCT Pub. No.: WO2011/051545
PCT Pub. Date: May 5, 2011

(65) Prior Publication Data
US 2012/0207121 A1  Aug. 16, 2012

Related U.S. Application Data

(60) Provisional application No. 61/280,122, filed on Oct. 30, 2009.

(51) Int. Cl.
| | |
|---|---|
| H04W 4/00 | (2009.01) |
| H04W 48/16 | (2009.01) |
| H04L 5/00 | (2006.01) |
| H04W 74/08 | (2009.01) |

(52) U.S. Cl.
CPC .............. *H04W 48/16* (2013.01); *H04L 5/0007* (2013.01); *H04L 5/001* (2013.01); *H04L 5/0091* (2013.01); *H04W 74/0866* (2013.01)
USPC .......................................................... 370/329

(58) Field of Classification Search
CPC ....................... H04W 72/1247; H04W 74/0475
See application file for complete search history.

(56) References Cited

U.S. PATENT DOCUMENTS

| | | | |
|---|---|---|---|
| 2006/0274712 A1 | 12/2006 | Malladi et al. | |
| 2009/0270103 A1* | 10/2009 | Pani et al. | ...................... 455/436 |

(Continued)

FOREIGN PATENT DOCUMENTS

| | | |
|---|---|---|
| WO | 2006/125149 A2 | 11/2006 |
| WO | WO 2006/125149 A3 | 11/2006 |

(Continued)

OTHER PUBLICATIONS

"Carrier Aggregation—Paging Optimization", 3GPP TSG-RAN-WG2 Meeting #66bis, R2-094545, Agenda Item: 7.3, Motorola, Aug. 24-28, 2009, 3 pages.

(Continued)

*Primary Examiner* — Chi H Pham
*Assistant Examiner* — Fahmida Chowdhury
(74) *Attorney, Agent, or Firm* — Harrington & Smith (57) ABSTRACT

In accordance with the exemplary embodiments of the invention, as described herein, there is at least a method, apparatus, and a computer program code to receive signaling from an access node of a wireless network that uses component carrier aggregation, the signaling including an identification of a plurality of component carriers and a priority associated with individual ones of the component carriers, and select one of the component carriers to camp on when in an idle mode. Further, in accordance with the exemplary embodiments of the invention, there is transmitting signaling from an access node of a wireless network that uses component carrier aggregation, the signaling including an identification of a plurality of component carriers and a priority associated with individual ones of the component carriers, and receiving a random access channel corresponding to a component carrier selected by a user equipment in accordance with the transmitted signaling.

20 Claims, 3 Drawing Sheets

```
3A: RECEIVING SIGNALING FROM AN ACCESS NODE OF
A WIRELESS NETWORK THAT USES COMPONENT
CARRIER AGGREGATION, THE SIGNALING COMPRISING
AN IDENTIFICATION OF A PLURALITY OF COMPONENT
CARRIERS AND A PRIORITY ASSOCIATED WITH
INDIVIDUAL ONES OF THE COMPONENT CARRIERS
              │
              ▼
3B: SELECTING ONE OF THE COMPONENT
CARRIERS TO CAMP ON WHEN IN AN IDLE
MODE
```

(56) References Cited

U.S. PATENT DOCUMENTS

2010/0215011 A1* 8/2010 Pan et al. .................. 370/329
2010/0227569 A1* 9/2010 Bala et al. .................. 455/73
2010/0278142 A1* 11/2010 Dwyer et al. .............. 370/331
2011/0216731 A1* 9/2011 Frederiksen et al. ...... 370/329

FOREIGN PATENT DOCUMENTS

| WO | 2009/120125 A1 | 10/2009 |
| WO | 2010/088930 A2 | 8/2010 |
| WO | 2010/123252 A2 | 10/2010 |

OTHER PUBLICATIONS

"3rd Generation Partnership Project;Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300, v8.7.0, Dec. 2008, pp. 1-144.

"3rd Generation Partnership Project; Technical Specification Group Radio Access Network; Requirements for further advancements for Evolved Universal Terrestrial Radio Access (E-UTRA) (LTE-Advanced) (Release 8)", 3GPP TR 36.913, V8.0.1, Mar. 2009, pp. 1-15.

"3rd Generation Partnership Project; Technical Specification Group Radio Access Network; Evolved Universal Terrestrial Radio Access (E-UTRA); User Equipment (UE) procedures in idle mode (Release 9)", 3GPP TS 36.304, v9.0.0, Sep. 2009, pp. 1-30.

"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331, v9.0.0, Sep. 2009, pp. 1-213.

"3rd Generation Partnership Project; Technical Specification Group Radio Access Network; Further advancements for E-UTRA physical layer aspects, (Release 9)", 3GPP TR 36.814, V0.4.1, Feb. 2009, pp. 1-31.

International Search Report and Written Opinion received for corresponding International Patent Application No. PCT/FI2010/050720, dated Feb. 17, 2011, 15 pages.

3GPP TR 36.814 V1.2.1 (Jun. 2009), Technical Report, 3rd Generation Partnership Project; Technical Specification Group Radio Access Network; Further Advancements for E-UTRA Physical Layer Aspects (Release 9), (45 pages).

* cited by examiner

IDLE MODE CAMPING PRIORITY

RELATED APPLICATION

This application was originally filed as PCT Application No. PCT/FI2010/050720 filed Sep. 17, 2010, which claims priority benefit to U.S. Provisional Application No. 61/280,122, filed Oct. 30, 2009.

TECHNICAL FIELD

The exemplary and non-limiting embodiments of this invention relate generally to wireless communication systems, methods, devices and computer programs and, more specifically, relate to control and management of idle mode camping of user equipment.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
ARFCN absolute radio frequency channel number
BCH broadcast channel
BW bandwidth
CC component carrier
CN core network
DL downlink (eNB towards UE)
eNB EUTRAN Node B (evolved Node B)
EPC evolved packet core
EUTRAN evolved UTRAN (LTE)
HSPA high speed packet access
IMSI international mobile subscriber identifier
LTE long term evolution
LTE-A long term evolution advanced
MAC medium access control
MIB master information block
MM/MME mobility management/mobility management entity
Node B base station
OFDMA orthogonal frequency division multiple access
O&M operations and maintenance
PDCP packet data convergence protocol
PDSCH physical downlink shared channel
PHY physical (Layer 1)
RACH random access channel
RAN radio access network
RLC radio link control
RRC radio resource control
SC-FDMA single carrier, frequency division multiple access
SCH shared channel
SGW serving gateway
SIB system information block
SIM subscriber identity module
UE user equipment
UL uplink (UE towards eNB)
USIM universal subscriber identity module
UTRAN universal terrestrial radio access network The specification of a communication system known as evolved UTRAN (EUTRAN, also referred to as UTRAN-LTE or as EUTRA) has been discussed within the 3GPP. As specified the DL access technique is OFDMA, and the UL access technique is SC-FDMA.

One specification of interest is 3GPP TS 36.300, V8.7.0 (2008-12), 3rd Generation Partnership Project; Technical Specification Group Radio Access Network; Evolved Universal Terrestrial Radio Access (EUTRA) and Evolved Universal Terrestrial Access Network (EUTRAN); Overall description; Stage 2 (Release 8). This system may be referred to for convenience as LTE Rel-8, or simply as Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published.

Figure 1A:
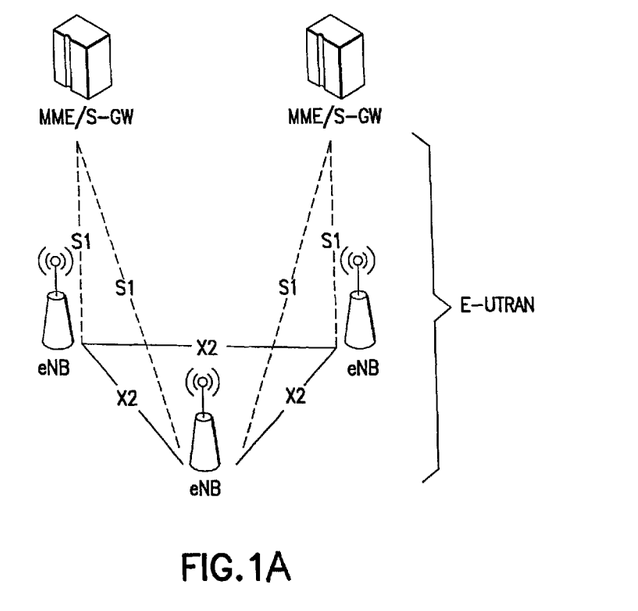
FIG. 1A reproduces FIG. 4.1 of 3GPP TS 36.300, and shows the overall architecture of the EUTRAN system.

FIG. 1A reproduces FIG. 4.1 of 3GPP TS 36.300, and shows the overall architecture of the E-UTRAN system. The E-UTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an S1 interface to an EPC, more specifically to a MME (Mobility Management Entity) by means of a S1 MME interface and to a Serving Gateway (SGW) by means of a S1 interface. The S1 interface supports a many to many relationship between MMEs/Serving Gateways and eNBs.

The eNB hosts the following functions:
functions for Radio Resource Management: Radio Bearer Control, Radio Admission Control, Connection Mobility Control, Dynamic allocation of resources to UEs in both uplink and downlink (scheduling);
IP header compression and encryption of the user data stream;
selection of a MME at UE attachment;
routing of User Plane data towards Serving Gateway;
scheduling and transmission of paging messages (originated from the MME);
scheduling and transmission of broadcast information (originated from the MME or O&M); and
measurement and measurement reporting configurations to provide mobility and scheduling.

Of particular interest herein are the further releases of 3GPP LTE targeted towards IMT-A systems, referred to herein for convenience simply as LTE-Advanced (LTE-A). Reference can be made to 3GPP TR 36.814, V1.2.1 (2009-06), 3rd Generation Partnership Project; Technical Specification Group Radio Access Network; Further Advancements for E-UTRA Physical Layer Aspects (Release 9). Reference can also be made to 3GPP TR 36.913, V8.0.1 (2009-03), 3rd Generation Partnership Project; Technical Specification Group Radio Access Network; Requirements for Further Advancements for E-UTRA (LTE-Advanced) (Release 8). A goal of LTE-A is to provide significantly enhanced services by means of higher data rates and lower latency with reduced cost.

As specified in 3GPP TR 36.913, LTE-A should operate in spectrum allocations of different sizes, including wider spectrum allocations than those of Rel-8 LTE, e.g., up to 100 MHz, to achieve the peak data rate of 100 Mbit/s for high mobility and 1 Gbit/s for low mobility. It has been agreed that carrier aggregation is considered for LTE-A in order to support port bandwidths larger than 20 MHz. Carrier aggregation, where two or more component carriers (CC) are aggregated, is considered for LTE-A in order to support transmission bandwidths larger than 20 MHz. The carrier aggregation could be contiguous or non-contiguous.

A terminal may simultaneously receive one or multiple component carriers depending on its capabilities. An LTE-A terminal with reception capability beyond 20 MHz can simultaneously receive transmissions on multiple component carriers. An LTE Rel-8 terminal can receive transmissions on a single component carrier only, provided that the structure of the component carrier follows the Rel-8 specifications.

Figure 1B:
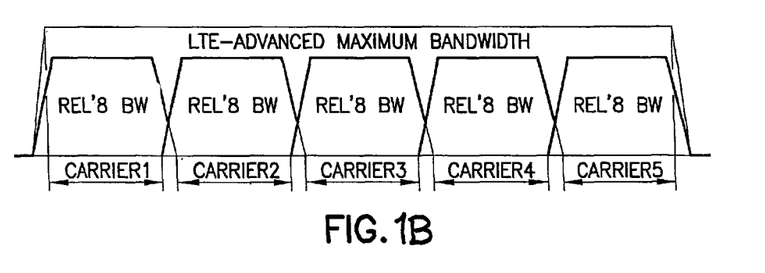
FIG. 1B shows an example of carrier aggregation for the LTE-A system.

FIG. 1B shows an example of the carrier aggregation, where M Rel-8 component carriers are combined together to form MxRel-8 BW, e.g. 5×20 MHz=100 MHz given M=5. Rel-8 terminals receive/transmit on one component carrier, whereas LTE-A terminals may receive/transmit on multiple component carriers simultaneously to achieve higher bandwidths.

Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

Of interest herein is E-UTRAN LTE-A idle mode mobility and load balancing. The carrier where a given UE is camping in the IDLE mode is unknown to the eNB. While the eNB has certain means to control the UEs as to which carrier they camp on, the control information is typically the same for all UEs and is not cell-specific. A particular UE changing from the IDLE state to the ACTIVE state consumes RACH resources in that cell. The UE becomes RRC-connected and, without being explicitly signaled, stays RRC-connected in that cell.

With further regard to carrier aggregation, what is implied is that one eNB can effectively contain more than one cell on more than one CC (component carrier), and the eNB can utilize one (as in E-UTRAN Rel-8) or more cells (in an aggregated manner) when assigning resources and scheduling the UE.

A Rel-8 UE will camp on a cell on a carrier frequency according to the absolute priority set for the frequencies. That is, the Rel-8 UE will attempt to camp on a cell of the highest priority frequency. Priorities used for the camping purpose are normally broadcast by the network, but the eNB can also signal dedicated priorities for the UE when the UE moves from the RRC_Connected to the RRC_Idle states, and these priorities remain in effect for some fixed duration (T320 timer, whose maximum length is 3 hours.) Using the broadcast technique for distributing frequency priority information implies that the UEs would all tend to camp on the same CC of the eNB. This can result in unbalanced UL load, for example, due to Random Access procedures.

Rel-8 assumes absolute priorities for frequency layers. With these, the UE attempts to stay on a highest priority layer as long as possible, while taking the radio conditions in the frequency layer into account. The UE uses certain thresholds (given by the network) into account (depending on radio conditions) when deciding whether to reselect to another carrier frequency. If the eNB signal level in the current frequency is worse than a given threshold, the UE is allowed to reselect to another frequency if an eNB signal level on that frequency is better than (another) given threshold.

The exact behavior and potential thresholds and parameters are described in more detail in 3GPP TS 36.304 V9.0.0 (2009-09) Technical Specification 3rd Generation Partnership Project; Technical Specification Group Radio Access Network; Evolved Universal Terrestrial Radio Access (E-UTRA); User Equipment (UE) procedures in idle mode (Release 9), and in 3GPP TS 36.331 V9.0.0 (2009-09) Technical Specification 3rd Generation Partnership Project; Technical Specification Group Radio Access Network; Evolved Universal Terrestrial Radio Access (E-UTRA) Radio Resource Control (RRC); Protocol specification (Release 9).

Reference may also be made to R2-094545, 3GPP TSG-RAN-WG2 Meeting #66bis, Shenzhen, P. R. China, Aug. 24-28, 2009, "Carrier Aggregation-Paging Optimization", Motorola. In R2-094545 it is stated that in this option, both the UE and the network use a hashing function to determine an ordered list of preferred camping carriers, based on the UE-id (IMSI, for example). The UE always camps on the most preferred carrier, provided that the carrier is capable of camping and there is coverage of that carrier at the current location of the UE. Because the network also knows this hash function, it can determine the most likely carrier in which the UE is camping. An appropriate paging algorithm can then be designed to use this ordering to preferentially page the UE in one or more carriers of the UE as per the preferred list. The hashing function can be designed in a fashion that the UEs are distributed across the different component carriers to distribute the paging load evenly.

SUMMARY

In an exemplary aspect of the invention, there is a method, comprising receiving signaling from an access node of a wireless network that uses component carrier aggregation, the signaling comprising an identification of a plurality of component carriers and a priority associated with individual ones of the component carriers, and selecting one of the component carriers to camp on when in an idle mode.

In another exemplary aspect of the invention, there is an apparatus, comprising at least one processor and at least one memory including computer program code, where the at least one memory and the computer program code are configured, with the at least one processor, to cause the apparatus to at least receive signaling from an access node of a wireless network that uses component carrier aggregation, the signaling comprising an identification of a plurality of component carriers and a priority associated with individual ones of the component carriers, and select one of the component carriers to camp on when in an idle mode.

In another exemplary aspect of the invention there is an apparatus, comprising means for receiving signaling from an access node of a wireless network that uses component carrier aggregation, the signaling comprising an identification of a plurality of component carriers and a priority associated with individual ones of the component carriers, means for selecting one of the component carriers to camp on when in an idle mode, and means for transmitting on a random access channel corresponding to the selected component carrier.

In another exemplary aspect of the invention there is a method, comprising transmitting signaling from an access node of a wireless network that uses component carrier aggregation, the signaling comprising an identification of a plurality of component carriers and a priority associated with individual ones of the component carriers, and receiving a random access channel corresponding to a component carrier selected by a user equipment in accordance with the transmitted signaling.

In still another exemplary aspect of the invention there is an apparatus, comprising at least one processor, and at least one memory including computer program code, where the at least one memory and the computer program code are configured, with the at least one processor, to cause the apparatus to at least transmit signaling from an access node of a wireless network that uses component carrier aggregation, the signaling comprising an identification of a plurality of component carriers and a priority associated with individual ones of the component carriers, and receive a random access channel corresponding to a component carrier selected by a user equipment in accordance with the transmitted signaling.

In yet another exemplary aspect of the invention there is an apparatus, comprising means for transmitting signaling from an access node of a wireless network that uses component carrier aggregation, the signaling comprising an identification of a plurality of component carriers and a priority associated with individual ones of the component carriers, and means for receiving a random access channel corresponding to a component carrier selected by a user equipment in accordance with the transmitted signaling.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

As similarly indicated above, in previous cellular systems, such as HSPA and LTE Rel-8 (and Rel-9), the terminal has only one carrier present. As such, the issue of load balancing (e.g., RACH load balancing) amongst different component carriers does not arise. It would therefore be desirable to provide techniques that address at least some of these issues.

Figure 2:
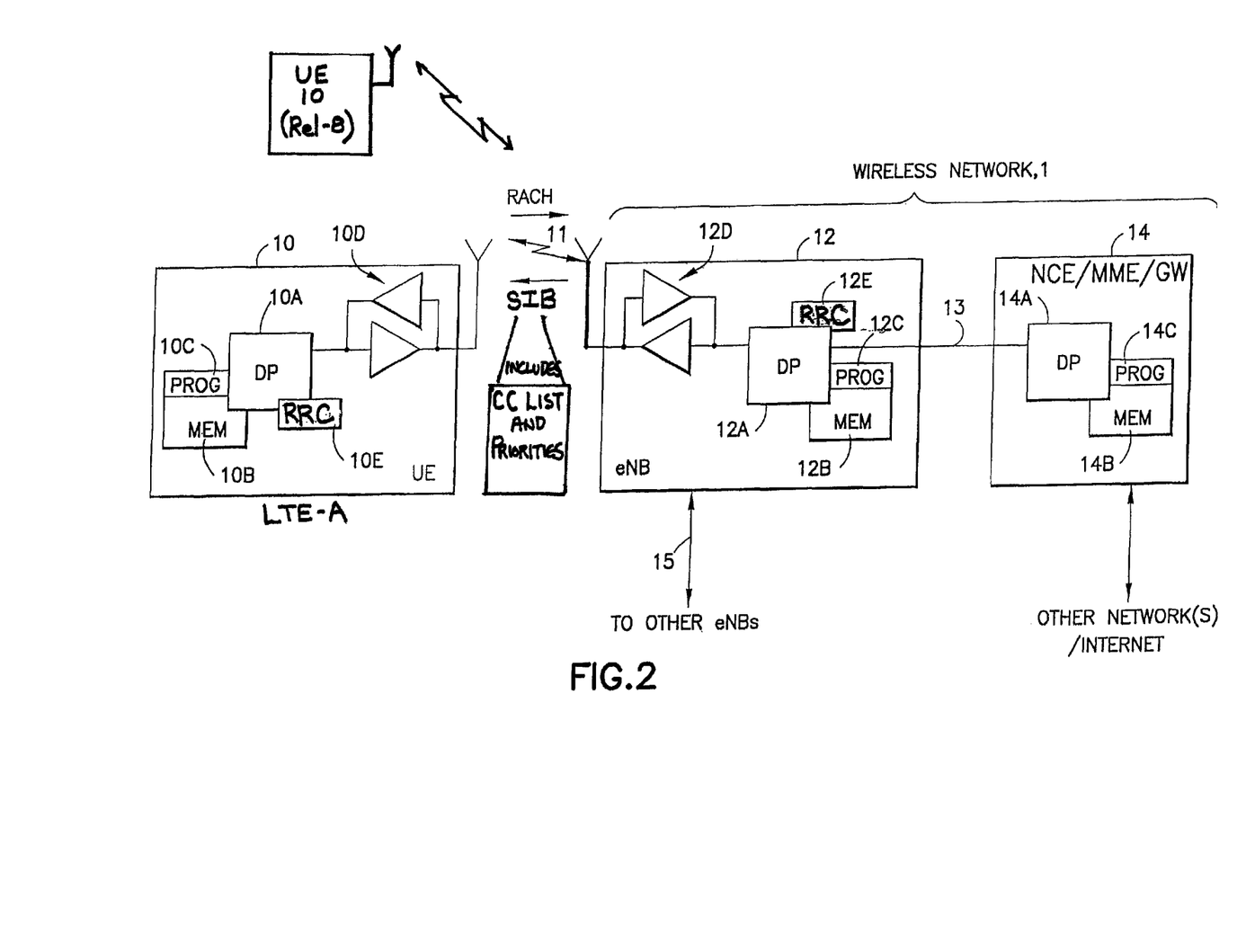
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices that are suitable for use in practicing the exemplary embodiments of this invention that have been described above. In FIG. 2 a wireless network 1 is adapted for communication over a wireless link 11 with an apparatus, such as a mobile communication device which may be referred to as a mobile station, which may be a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the Internet). The UE 10 includes a controller, such as at least one computer or a data processor (DP) 10A, a computer-readable memory medium embodied as at least one memory (MEM) 10B that stores a program of computer instructions (PROG) 10C, and a suitable radio frequency (RF) transceiver 10D for bidirectional wireless communications with the eNB 12 via one or more antennas. Note that the memory 10B may include a SIM/USIM. The eNB 12 also includes a controller, such as at least one computer or a data processor (DP) 12A, a computer-readable memory medium embodied as at least one memory (MEM) 12B that stores a program of computer instructions (PROG) 12C, and a suitable RF transceiver 12D for communication with the UE 10 via one or more antennas. The eNB 12 is assumed to be associated with at least one cell within which a plurality of the UEs 10 can be present at any given time. At any given time one or more of the UEs 10 may be Rel-8 compatible UEs, while one or more other UEs 10 may be LTE-A compatible UEs. Though the compatibility of the UEs may not be limited as such. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 may be assumed to also include a RRC unit or function 10E, and the eNB 12 also includes a RRC unit or function 12E. The operation of the RRC units/functions 10E, 12E is described in detail below.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware). The RRC units/functions 10E, 12E may thus also be implemented at least in part by computer software, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory (e.g., SIM/USIM). The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

The exemplary embodiments of this invention provide a technique that includes an indication of LTE-A CCs in existing inter-frequency neighbor information in a system information block (SIB), such as SIB5, which is what is used in Rel-8 for inter-frequency neighbor information broadcast. The information that is added to the SIB includes the carrier frequency of the component carriers (CC) and also priority information for the CCs (shown generally in FIG. 2 as "CC List and Priorities").

In LTE SIBs are transmitted on the DL-SCH mapped on the PDSCH. To receive information about SIBs the UE 10 needs information about the PHICH, which is read from the MIB.

Reference with regard to the currently existing SIB5 can be made to the above referenced 3GPP TS 36.331 V9.0.0 (2009-

09), in subsection 6.3, RRC information elements, subclause 6.3.1, System information blocks, in particular pages 109-110, SystemInformationBlock Type 5. The information element (IE) SystemInformationBlockType5 is currently defined to contain information relevant only for inter-frequency cell re-selection, i.e., information about other E-UTRA frequencies and inter-frequency neighbouring cells relevant for cell re-selection. The IE includes cell re-selection parameters common for a frequency as well as cell-specific re-selection parameters.

One method to enable load balancing (or random access distribution, where each DL CC is linked to one UL CC) spreads the UE camping load such that not all UEs (LTE-A and other non-LTE-A UEs) would camp on the same DL CC. This can be accomplished by providing LTE-A CCs with priority information together with the existing Rel-8 priority method, and giving a LTE-A (non-backwards) compatible CC (included, for example, in SIB5) the highest absolute priority.

A backwards compatible CC (one presently in SIB5, and thus compatible with a Rel-8 UE 10) can be assigned an absolute priority lower than those used/reserved for LTE-A (non-backwards compatible) CCs. A non-backwards compatible CC can be considered to be one that is usable by an LTE-A compatible UE 10, but not usable by a Rel-8 UE 10.

Stated another way, those CCs that should be camped on by non-LTE-A capable UEs 10 (e.g., Rel-8 only UEs) can be broadcast as is done presently in Rel-8. Those CCs that should not be camped on by any non-LTE-A UEs can be listed, for example in SIB5, such that they are not decoded by non-LTE-A UEs. These CCs (carrier and priority information) are prioritized by the LTE-A capable UE 10 by applying a highest absolute priority to these CCs.

In general, a pre-LTE-A UE 10 may be considered as being a Rel-8/9 UE. However, there may be a case as well of a LTE-A UE 10 that does not support carrier aggregation, but that does support some other LTE-A feature or features. As such, for the purposes of describing the exemplary embodiments of this invention a "non-LTE-A UE" may be considered as a UE that does not support, or operate with, carrier aggregation.

The approach discussed above results in behavior in which non-LTE-A UEs 10 (e.g., Rel-8/9 UEs) would camp exactly as in Rel-8/9, while LTE-A compatible UEs 10 would try to camp on the highest priority carrier frequency of the compatible CCs (which may be CCs not available to Rel-8/9 UEs 10). The basic rules from Rel-8/9 are still applicable to the LTE-A UEs, but in general they can have a larger range of CCs to camp on (neighbor carrier).

It should be noted that CC aggregation benefits the LTE-A UEs 10, as Rel-8/Rel-9 UEs are only able to utilize a single (UL-DL) CC (pair) at a time. The information concerning the CC priority that is conveyed by, for example, SIB5 is understood only by LTE-A UEs. Therefore, the non-LTE-A UEs will utilize CC priorities according to Rel-8/Rel-9 priority rules, while the LTE-A UEs may have different CC priorities (due to the additional information read from SIB5 by the LTE-A UEs).

Assuming that RACH is initiated by the UE 10 in the cell on which it is camped, the use of these exemplary embodiments results in an improved distribution of the UEs amongst the available CCs, ensures that not all UEs will camp on same cell (and potentially lead to RACH congestion).

A similar approach can be applied also for the case where a cell on a CC is non-backwards compatible, while other cells are backwards compatible.

What follows is one non-limiting example (based on E-UTRAN) of a technique to implement the exemplary embodiments of this invention.

As was noted above, the information can be broadcast using, for example, SIB5, which includes information concerning neighbor cells (3GPP TS 36.331).

The additional information to be included in accordance with the exemplary embodiments of this invention is an (optional) indication of LTE-A-specific CCs and priorities to be used only by LTE-A compatible (capable) UEs 10. The detailed information included in, for example, SIB5 can include, but is not limited to, a list of considered LTE-A frequencies and their relative priorities.

Concerning the additional priority information there are at least two options. A first option includes an explicit priority to be used for each frequency. The explicit priority is aligned with the priorities used for non-LTE-A frequencies. For example, a LTE-A only CC (frequency) would have priority 1, and non-LTE-A CCs (frequencies) would have priorities beginning from 2.

It should be noted that the foregoing discussion distinguishes between carriers available according to pre-LTE-A releases of the specification (e.g., Rel-8/9) and those carriers which should be used by UEs supporting later releases. However, it should be realized that a carrier which is Rel-8/9 compliant could also be broadcast using the enhanced coding in accordance with the exemplary embodiments of this invention. In general, the usage of the carriers can be considered a matter of network policy.

A second option includes an explicit priority to be used with each LTE-A CC (frequency). These priorities are given independently from non-LTE-A CCs, and final priority handling is performed internally in the UE 10 according to specified rules. For example, an LTE-A CC (frequency) is given priority 1, and a non-LTE-A CC (frequency) is also given priority 1. Assuming that the UE 10 is LTE-A capable it prioritizes LTE-A only CC (frequency) and the result is that the LTE-A CC has priority 1 and a non-LTE-A CC (frequency) has priority 2.

This approach has the benefit of distributing non-LTE-A and LTE-A UEs 10 separately according to their capabilities and thereby also allowing for RACH load distribution (as the camping will be distributed according to the priorities). Further, this approach has no impact on legacy non-LTE-A UEs 10 (e.g., Rel-8 only UEs) or the idle mobility planning in the network.

An alternative (but somewhat similar approach) is to broadcast LTE-A-specific priority information. In this case the carrier information is broadcast in a manner similar to Rel-8, and non-LTE-A and LTE-A capable UEs 10 both use same broadcast information. A new field is added in the broadcast message (e.g., is added in SIB5) which gives priority information for LTE-A capable UEs only, while non-LTE-A UEs use priority information as broadcast according to the legacy (e.g., Rel-8) specification.

Note that in general whether a non-LTE-A UE is able to camp on an LTE-A CC depends on whether the CCs broadcast Rel-8/Rel-9-compatible system information. In accordance with an aspect of the exemplary embodiments of this invention, the new information included in, for example, SIB5 is only read by LTE-A UEs, and this information then affects only the LTE-A UE 10 camping rules. However, the rules for Rel-8/Rel-9 camping need not be modified, and non-LTE-A compatible (e.g., Rel-8 or Rel-9) UEs are enabled to operate as already specified.

Either explicit or implicit frequency priorities can be used. With explicit priorities, the list of frequencies and their priorities are always provided, while with implicit priorities only an ARFCN priority list would be included, and the UE 10 then permutes the existing frequency priorities according to some UE-specific information (e.g., the UE IMSI) so that on average, the UEs would become equally distributed across the LTE-A CCs.

Note that while the exemplary embodiments of this invention have been described thus far in the context of using SIB5, in other exemplary embodiments a new SIB could be defined for broadcasting the CC and priority information to the LTE-A UEs 10. Alternatively, dedicated (point-to-point) signaling could be used for imparting this information to the LTE-A UEs 10.

In another exemplary embodiment, the eNB 12 signals only the carrier information, and not priority information. In this case the network can list the component carriers in a prioritized manner, e.g., such that the CC with a highest priority is listed first, the CC with a second highest priority is listed second, and so forth. The UE 10 receiving this information can thus implicitly determine the priorities based on the ordering of the CCs in the list of CCs. This scheme can be combined with the behavior explained above.

Another option that falls within the scope of the exemplary embodiments of this invention is to broadcast all frequencies in a Rel-8/9 compatible manner, and leave out priorities for those carriers that should not be used by Rel-8/9 (non-LTE-A) UEs. Priority information for these carriers (to be used by LTE-A UEs) is then broadcast such that it will only be decoded by LTE-A capable UEs. Instead of broadcasting the information it is of course possible to also use dedicated signaling. This approach is feasible since UEs in E-UTRAN will not consider carrier/frequencies for reselection which do not have priority information.

There are a number of advantages and technical effects that can be realized by the use of these exemplary embodiments of this invention. For example, the use of these exemplary embodiments provides a technique to distribute the RACH load and the UE camping on CCs in the idle mode. Further by example, non-LTE-A UEs (e.g., Rel-8 UEs) are not affected by the use of the priorities, as they need not be aware of, nor be required to decode, the additional CC-related signaling. Further by example, LTE-A UEs can apply the same behavior concerning priorities as Rel-8 UEs, thereby simplifying the specifications and standardization. Further by example, clear and unambiguous UE 10 behavior is implied with only simple and relatively minor changes being made to the relevant specifications (as the basic rules are not changed).

An additional advantage that is realized over an approach that would employ the SIB for load condition indications and probabilistic functionality to determine a RACH CC, as this type of approach would require frequent updates of the SIB. As a result, the UE 10 would need to read the SIB prior to access to determine the correct RACH CC, thereby slowing the overall access procedure. In addition, the probability may be based on historical information, which would not impart much knowledge concerning future loading.

The use of the exemplary embodiments of this invention does not require that frequent SIB updates be made, as the frequency/priority information can be considered as being relatively static, and furthermore is fully backwards compatible with non-LTE-A UEs and procedures.

To reiterate, in Rel-8 the UE 10 camps on a cell on a carrier frequency according to the absolute priority set for the frequencies. These priorities are normally broadcast by the network in order to distribute the priority information. This type of operation can, however, result in all of the UEs tending to camp on the same CC of the eNB 12. One consequence of this type of behavior is that UL load can become unbalanced due to, for example, random access operation of the UEs 10.

In the LTE-A system, with CC aggregation, the eNB 12 can utilize one or more cells when assigning resources and scheduling the UEs.

In accordance with the exemplary embodiments of this invention, the eNB 12 includes an indication of LTE-A CCs in existing inter-frequency neighbor information in (for example) SIB5, wherein the added information can include the carrier frequency of each of the CCs and priority information related to the CCs. Those CCs that should be camped on by non-LTE-A capable UEs (e.g., Rel-8 UEs) are broadcast as in Rel-8, while those CCs that should not be camped on by non-LTE-A capable UEs are listed in SIB5, and are not recognized or decoded by non-LTE-A capable UEs.

The carrier/priority information is prioritized by the LTE-A capable UEs 10 by applying the highest absolute priority to these CCs.

In accordance with one exemplary embodiment, the information is broadcast within the existing SIB5, which includes information about neighbor cells. The information includes the list of considered LTE-A frequencies and their priorities. In one case an explicit priority is used for each frequency, where the priority is aligned with the priorities used for non-LTE-A frequencies. In another case an explicit priority is used with each LTE-A CC (frequency). These priorities are given independently from the non-LTE-A CCs and final priority handling is performed by the UE 10 according to some specified rule or rules.

In accordance with another exemplary embodiment, the eNB 12 broadcasts LTE-A specific priority information. In this case the carrier information can be broadcast in a manner similar to Rel-8, and non-LTE-A and LTE-A-capable UEs 10 both use the same broadcast information. A new field may be added in the broadcast message (e.g., in SIB5) which gives priority information for LTE-A capable UEs only, while non-LTE-A UEs use priority information as broadcast according to the applicable legacy specification.

In accordance with another exemplary embodiment, the eNB 12 signals an indication of only the carriers without explicit priority information. In this case the network lists the component carriers in a prioritized manner, e.g., such that the CC with the highest priority is listed first, followed by the next highest priority CC, and so on. In this embodiment the receiving UE 10 can determine the network assigned CC priority by the order in which the CCs appear in the list.

In accordance with one non-limiting aspect of the exemplary embodiments of this invention the eNB 12 is enabled to flexibly guide the UE 10 to a particular RACH in different CCs according to the system RACH load situation, as well as in accordance with RACH access policies per CC. This is accomplished by the BCH carrying some information to allow the eNB 12 to impact the RACH load distribution on different carriers.

In accordance with yet another non-limiting aspect of the exemplary embodiments of this invention, all (or at least some) carriers are broadcast in a Rel-8/9 (backwards-compatible) manner, where some of the carriers do not include priority information. Instead, the priority information for those carriers is broadcast, e.g., in SIB5, such that only LTE-A capable UEs can decode the priority information. Alternatively, the priority information can be transmitted to the LTE-A UEs using dedicated signaling.

In should be noted that the concept of an "Access Class", as currently specified, is different from a priority used for reselection. A particular UE 10 has one or more access classes stored in an associated SIM/USIM. This information is used when the UE 10 has to access the cell using a RACH. An access priority class thus differs from priority settings used for idle mode camping and reselection.

The exemplary embodiments of this invention use CC priority information as a means for distributing a population of UEs 10 among available CCs, and priority of carriers is used for camping and idle mode re-selection. By setting the priority of those LTE-A compatible UEs differently than non-LTE-A UEs, the UEs are distributed over the CCs while still taking reselection rules, and thereby also basic radio conditions, into account. This priority information can be substantially static, and thus a particular UE 10 need not operate to receive and decode the MIB/SIB (BCH) prior to accessing the cell in order to determine a current cell load.

Figure 3:
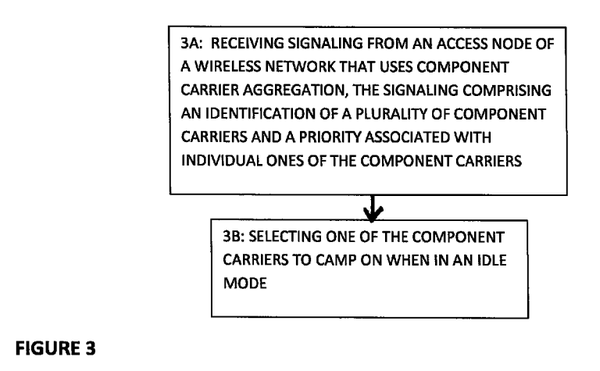
FIGS. 3 and 4 are each a logic flow diagram illustrating the operation of a method, and a result of execution of computer program instructions embodied on a computer readable medium, in accordance with the exemplary embodiments of this invention.

FIG. 3 is a logic flow diagram that illustrates the operation of a method, and a result of execution of computer program instructions, in accordance with the exemplary embodiments of this invention. In accordance with these exemplary embodiments a method performs, at Block 3A, a step of receiving signaling from an access node of a wireless network that uses component carrier aggregation, the signaling comprising an identification of a plurality of component carriers and a priority associated with individual ones of the component carriers. At Block 3B there is a step of selecting one of the component carriers to camp on when in an idle mode.

The method as in the preceding paragraph, further comprising using a random access channel corresponding to the selected component carrier.

The method as in the preceding paragraphs, wherein the signaling is received from a broadcast channel.

The method as in the preceding paragraph, wherein the signaling is received in a system information block.

The method as in the preceding paragraph, wherein the system information block is SysteminformationBlock Type 5.

The method as in FIG. 3, where the signaling is dedicated signaling.

The method as in FIG. 3, where the priority is one of explicitly indicated or implicitly indicated.

The method as in the preceding paragraph, where receiving is performed by a first type of user equipment capable of concurrent operation with a plurality of component carriers, and where the priority associated with individual ones of the component carriers are one of aligned with those of any component carriers used by a second type of user equipment not capable of concurrent operation with a plurality of component carriers, or are independent of any component carriers used by the second type of user equipment.

The method as in the preceding paragraph, where the priorities are determined by the first type of user equipment in accordance with an order in which the component carriers are listed.

The exemplary embodiments of this invention also encompass an apparatus that comprises a processor and a memory that includes computer program code. The memory and computer program code are configured to, with the processor, cause the apparatus at least to perform, receiving signaling from an access node of a wireless network that uses component carrier aggregation, the signaling comprising an identification of a plurality of component carriers and a priority associated with individual ones of the component carriers; selecting one of the component carriers to camp on when in an idle mode; and transmitting on a random access channel corresponding to the selected component carrier.

The exemplary embodiments of this invention further provide an apparatus comprising means for receiving signaling from an access node of a wireless network that uses component carrier aggregation, the signaling comprising an identification of a plurality of component carriers and a priority associated with individual ones of the component carriers; means for selecting one of the component carriers to camp on when in an idle mode; and means for transmitting on a random access channel corresponding to the selected component carrier.

Figure 4:
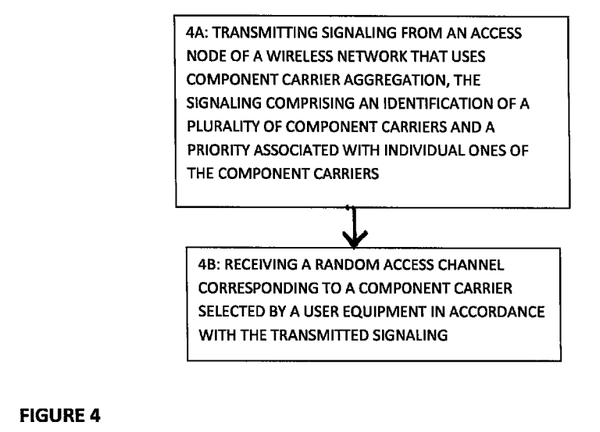

FIG. 4 is a logic flow diagram that illustrates the operation of a method, and a result of execution of computer program instructions, further in accordance with the exemplary embodiments of this invention. In accordance with these exemplary embodiments a method performs, at Block 4A, a step of transmitting signaling from an access node of a wireless network that uses component carrier aggregation, the signaling comprising an identification of a plurality of component carriers and a priority associated with individual ones of the component carriers. At Block 4B there is a step of receiving a random access channel corresponding to a component carrier selected by a user equipment in accordance with the transmitted signaling.

The method as in the preceding paragraph, wherein the signaling is transmitted on a broadcast channel.

The method as in the preceding paragraph, wherein the signaling is transmitted in a system information block.

The method as in the preceding paragraph, wherein the system information block is SysteminformationBlock Type 5.

The method as in FIG. 4, where the transmitted signaling is dedicated signaling.

The method as in FIG. 4, where the priority is one of explicitly indicated or implicitly indicated.

The method as in the preceding paragraph, where the signaling is received by a first type of user equipment capable of concurrent operation with a plurality of component carriers, and where the priority associated with individual ones of the component carriers are one of aligned with those of any component carriers used by a second type of user equipment not capable of concurrent operation with a plurality of component carriers, or are independent of any component carriers used by the second type of user equipment.

The method as in the preceding paragraph, where the priorities are determined by the first type of user equipment in accordance with an order in which the component carriers are listed.

The exemplary embodiments of this invention also encompass an apparatus that comprises a processor and a memory that includes computer program code. The memory and computer program code are configured to, with the processor, cause the apparatus at least to perform, transmitting signaling from an access node of a wireless network that uses component carrier aggregation, the signaling comprising an identification of a plurality of component carriers and a priority associated with individual ones of the component carriers; and receiving a random access channel corresponding to a component carrier selected by a user equipment in accordance with the transmitted signaling.

The exemplary embodiments of this invention also encompass an apparatus that comprises means for transmitting signaling from an access node of a wireless network that uses component carrier aggregation, the signaling comprising an identification of a plurality of component carriers and a priority associated with individual ones of the component carriers; and means for receiving a random access channel corresponding to a component carrier selected by a user equipment in accordance with the transmitted signaling.

The blocks shown in FIGS. 3 and 4 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) and LTE-A systems, it should be appreciated that the exemplary embodiments of this invention are not limited for use with only these particular types of wireless communication system, and that they may be used to advantage in other wireless communication systems that use multiple carriers that can be camped on in an idle state, and in which are used during a random access procedure.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and information elements (e.g. "SIB", "SysteminformationBlock Type 5", etc.) are not intended to be limiting in any respect, as these parameters and information elements may be identified by any suitable names.

Further, the various names assigned to different channels (e.g., BCH, RACH, etc.) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    receiving signaling from an access node of a wireless network that uses component carrier aggregation, the signaling being received by a user equipment configured for carrier aggregation and comprising an identification of a plurality of aggregated component carriers and a priority associated with individual ones of the aggregated component carriers; and
    selecting, based at least in part on the priority associated with individual ones of the aggregated component carriers, one of the identified aggregated component carriers to camp on when in an idle mode.

2. The method according to claim 1, further comprising using a random access channel corresponding to the selected component carrier.

3. The method according to claim 1, wherein the signaling is received from a broadcast channel.

4. The method according to claim 1, wherein the signaling is received in a system information block.

5. The method according to claim 4, wherein the system information block is SysteminformationBlock Type 5.

6. The method according to claim 1, wherein the signaling is dedicated signaling.

7. The method according to claim 1, wherein the priority is one of explicitly indicated or implicitly indicated.

8. The method according to claim 1, wherein receiving is performed by a first type of user equipment capable of concurrent operation with a plurality of component carriers, and wherein the priorities associated with individual ones of the component carriers are one of aligned with those of any component carriers used by a second type of user equipment not capable of concurrent operation with a plurality of component carriers, or are independent of any component carriers used by the second type of user equipment.

9. The method according to claim 1, wherein the priority is determined in accordance with an order in which the component carriers are identified.

10. A non-transitory computer readable medium storing a program of instructions, execution of which by a processor configures an apparatus to perform actions comprising at least:
    receiving signaling from an access node of a wireless network that uses component carrier aggregation, the signaling being received by a user equipment configured for carrier aggregation and comprising an identification of a plurality of aggregated component carriers and a priority associated with individual ones of the aggregated component carriers; and
    selecting, based at least on the priority associated with individual ones of the aggregated component carriers, one of the identified aggregated component carriers to camp on when in an idle mode.

11. An apparatus comprising:
   at least one processor; and
   at least one memory including computer program code, wherein the at least one memory and the computer program code are configured, with the at least one processor, to cause the apparatus to at least:
   receive signaling from an access node of a wireless network that uses component carrier aggregation, the signaling being received by a user equipment configured for carrier aggregation and comprising an identification of a plurality of aggregated component carriers and a priority associated with individual ones of the aggregated component carriers; and
   select, based at least on the priority associated with individual ones of the aggregated component carriers, one of the identified aggregated component carriers to camp on when in an idle mode.

12. The apparatus according to claim 11, further comprising the at least one memory and the computer program code are configured, with the at least one processor to cause the apparatus to use a random access channel corresponding to the selected component carrier.

13. The apparatus according to claim 11, wherein the signaling is received from a broadcast channel.

14. The apparatus according to claim 11, wherein the signaling is received in a system information block.

15. The apparatus according to claim 14, wherein the system information block is SysteminformationBlock Type 5.

16. The apparatus according to claim 11, where the signaling is dedicated signaling.

17. The apparatus according to claim 11, wherein the priority is one of explicitly indicated or implicitly indicated.

18. The apparatus according to claim 11, wherein the priority is determined in accordance with an order in which the component carriers are identified.

19. An apparatus, comprising:
   at least one processor; and
   at least one memory including computer program code, wherein the at least one memory and the computer program code are configured, with the at least one processor, to cause the apparatus to at least:
   transmit signaling from an access node of a wireless network that uses component carrier aggregation, the signaling being transmitted to a plurality of user equipment configured for carrier aggregation and comprising an identification of a plurality of aggregated component carriers and a priority associated with individual ones of the aggregated component carriers; and
   receive a random access channel corresponding to one of the identified aggregated component carriers that is selected by a user equipment in accordance with the transmitted signaling, where the random access channel is selected to be camped on by the user equipment in the idle mode based at least in part on the priority associated with individual ones of the aggregated component carriers, and where
   the transmitted signaling is configured to be carried over the plurality of aggregated component carriers to affect a number of idle mode user equipment that are camped on the plurality of aggregated component carriers.

20. The apparatus according to claim 19, wherein the signaling is transmitted in a system information block.

* * * * *